United States Patent Office 3,296,091
Patented Jan. 3, 1967

3,296,091
MICROBIOLOGICAL CONVERSION OF
UNSATURATED FATTY ACIDS
Philip F. Beal III, Kalamazoo, Gunther S. Fonken,
Charleston Township, Kalamazoo County, and John E.
Pike, Kalamazoo, Mich., assignors to The Upjohn Company, Kalamazoo, Mich., a corporation of Delaware
No Drawing. Filed Feb. 19, 1964, Ser. No. 345,852
16 Claims. (Cl. 195—30)

This invention relates to a novel process for the microbiological conversion of unsaturated fatty acids and is more particularly concerned with a process for the microbiological conversion of unsaturated fatty acids to substituted cyclopentane derivatives having the basic prostaglandin-type structure as hereinafter defined.

The process of the invention, in its broadest aspect, comprises aerobically incubating an unsaturated fatty acid having a 1,4-diene grouping in the hydrocarbon chain with comminuted mammalian gland tissue in a substantially aqueous medium and obtaining thereby a product having prostaglandin-like activity as hereinafter defined.

The term prostaglandin is used broadly to designate a material, having hypotensive and smooth muscle-stimulating activity, obtained from accessory genital glands, sperm and the like. Thus, hypotensive activity was noted by Japelli and Scopa in 1906 (Arch. Ital. Biol. 45, 165) in an extract of dog prostate glands. Hypotensive activity and smooth muscle stimulating activity where noted in extracts from comparable sources by Kurzrok in 1931 (Proc. Soc. Exp. Biol. N.Y. 28, 268), Goldblatt in 1933 (Chem. E. Ind. 52, 1056), and von Euler in 1931–6 (Arch. Exp. Path. Pharmak. 175, 78 (1934), 181 (1936), J. Physiol. 72, 74 (1931), 81, 102 (1934), 84, 21 (1935), 88, 213 (1936), Klin. Wschr. 14, 1182 (1935)). A crude material, designated prostaglandin, having hypotensive activity and smooth muscle-stimulating activity was reported by von Euler.

Recently (Acta Chemica Schandinavia 14; 1693–1704, 1960) two distinct compounds designated PGE and PGF have been isolated from crude materials such as von Euler prostaglandin. The structure of these compounds has been shown to be as follows:

PGE (also termed PGE₁) has the following structure:

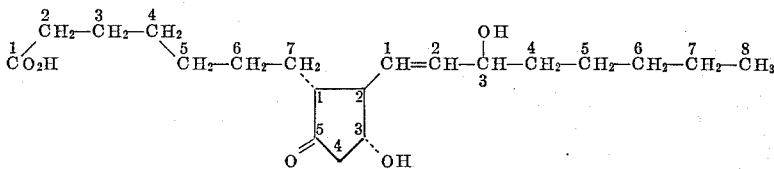

and is named systematically (using the numbering shown) as 7 - [3α-hydroxy-2-(3-hydroxy-1-octenyl)-5-oxocyclopentyl]-heptanoic acid.

PGF (also termed PGF₁α) has the following structure:

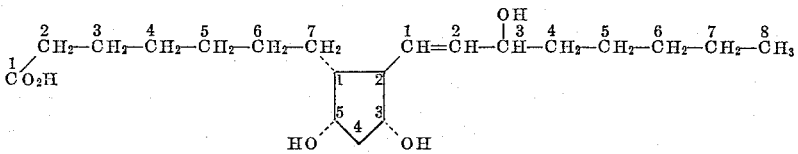

and is named systematically (using the numbering shown) as 7-[3α,5α-dihydroxy-2-(3-hydroxy-1-octentyl)-cyclopentyl]-heptanoic acid.

The dotted line attachments shown in the above formula indicate that these substituents are in the α-configuration, i.e., are below the plane of the cyclopentane nucleus.

The PGE series of compounds is characterized by the presence of the keto group at the 5-position in the cyclopentane ring. The PGF series is characterized by the presence of the hydroxyl group at the 5-position in the cyclopentane ring. Various other members of the PGE and PGF series are known and are named either systematically or in terms of their relationship to PGE and PGF. Thus reduction of PGE with sodium borohydride gives PGF and the β-epimer thereof in which the hydroxyl group at the 5-position in the cyclopentane ring is in the β-configuration. This β-epimer is known as epi-PGF or PGF$_β$, the β-suffix indicating the configuration of the hydroxyl at the 5-position. The compound designated PGF above is also often designated as PGF$_α$ to show the configuration of the hydroxyl at the 5-position.

Each of the compounds PGE, PGF and epi-PGF on hydrogenation gives rise to the corresponding saturated acids, namely:

dihydro PGE=7-[3α-hydroxy-2-(3-hydroxyoctyl)-5-oxo-cyclopentyl]-heptanoic acid dihydro PGF$_a$=7-(3α,5α-dihydroxy-2-(3-hydroxyoctyl)-cycylopentyl]-heptanoic acid dihydro-epi-PGF (or dihydro PGF$_β$)=7-[3α,5β-dihydroxy-2-(3-hydroxyoctyl)-cyclopentyl]-heptanoic acid All of these dihydro acids have the same activity which is typical of PGE and PGF.

Various dehydro derivatives of PGE and PGF are also known as follows, the numeral suffix in the names of these compounds indicating the number of double bonds in the molecule.

Bisdehydro-PGE (PGE$_2$)=7-[3α-hydroxy-2-(3-hydroxy-1-octenyl)-5-oxocyclopentyl]-5-heptenoic acid Tetradehydro - PGE (PGE$_3$)=7-[3α-hydroxy-2-(3-hydroxy - 1,5-octadientyl)-5-oxocyclopentyl]-5-heptenoic acid Bisdehydro-PGF (PGF$_{2α}$)=7-[3α,5α-dihydroxy-2-(3-hydroxy-1-octenyl)-cyclopentyl]-5-heptenoic acid Tetradehydro-PGF (PGF$_{3α}$)=7 - [3α,5α - dihydroxy - 2-(3 - hydroxy - 1,5 - octadienyl) - cyclopentyl] - 5 - heptenoic acid Tetradehydroepi-PGF (PGF$_{3β}$)=7 - [3α,5β - dihydroxy-2 - (3 - hydroxy - 1,5 - octatdienyl) - cyclopentyl] - 5-heptenoic acid All the acids set forth above, as well as the esters and salts thereof as hereinafter defined and exemplified, possess the hypotensive and smooth muscle-stimulating activity typical of the von Euler prostaglandin, which activity is referred to throughout this specification as prostaglandin-like activity.

It is an object of this invention to provide a process for the preparation of the above group of compounds as well as compounds closely related structurally thereto, all of which compounds exhibit prostaglandin-like activity. It is a further object of this invention to provide a method of cyclizing fatty acids having a 1,4-diene group to the corresponding cyclopentylalkanoic acids.

In accordance with the process of the invention an unsaturated fatty acid having a 1,4-diene group in the chain is incubated under aerobic conditions with comminuted mammalian gland tissue. The substrate undergoes ring closure involving the carbons in the 1 and 5 positions in the 1,4-diene moiety together with oxygenation at the 2 and 4 positions in said moiety, which series of changes can be represented broadly as follows:

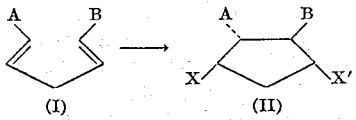

wherein A and B represent the residue of an unsaturated fatty acid and X an X' are selected from the group consisting of hydroxy and keto. The exact mechanism of the changes which take place in the process of the invention is not known. The following is offered as a possible mechanism which is depicted merely to assist in the understanding of the invention. The suggested mechanism does not in any way limit the scope and nature of this invention.

POSSIBLE MECHANISM OF PROCESS

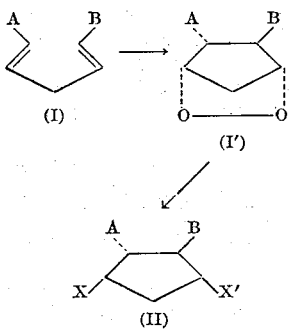

In the postulated mechanism shown above, the first step involves the conversion of the substrate (I) to the cyclized endoperoxide I' which latter is then converted to the 3,5-dioxygenated product (II) in which A, B, X and X' are as hereinbefore defined.

In certain instances we have found that, in addition to the cyclization and 3,5-oxygenation described above, the substrate (I) when subjected to the process of the invention also undergoes oxygenation at one or more positions in the side chains A and/or B. Such side chain oxygenation generally occurs when the side chain in question contains an unsaturated linkage, particularly where said unsaturated linkage is separated by one methylene group from the 1,4-diene system of the substrate, i.e., where the chain of the fatty acid substrate contains one of the following partial structures:

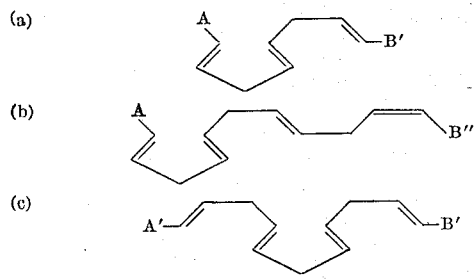

The side-chain oxygenation involves the carbon atoms of the unsaturated linkages in such compounds. For example, the main product obtained by subjecting the substrate (a) above to the process of the invention has the formula:

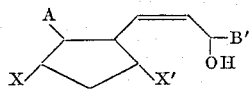

wherein X and X' have the significance defined above.

Similarly the products obtained by subjecting substrate (b) to the process of the invention are:

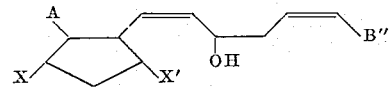

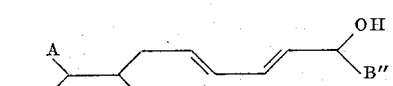

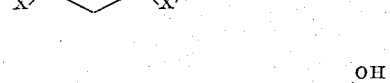

and

The products obtained by subjecting substrate (c) above to the process of the invention are:

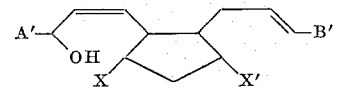

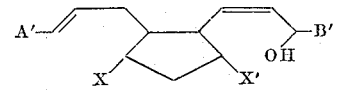

and

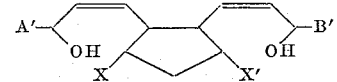

We have found that the side chain oxygenation occurs most readily when the double bonds in the side chain (the double bond or bonds separated by a methylene group from the 1,4-diene structure of the substrate) have the cis configuration, i.e., the hydrogen atoms attached to the carbon atoms of the double bond are in the cis position.

The process of the invention is carried out by incubating the desired substrate under aerobic conditions with mammalian gland tissues and recovering from the incubation mixture a material having prostaglandin-like activity. The mammalian gland tissue employed can be that of cattle, sheep, or hog, adrenal, vesicular and the like glands, with sheep vesicular gland tissue being especially preferred.

The unsaturated fatty acid employed as substrate in the process of the invention can be that normally occurring in the animal tissue or it can be added to the incubation mixture from external sources.

In carrying out the process of the present invention, the whole, fresh-frozen glands obtained from slaughtered animals are first comminuted by any suitable means. This is usually accomplished with a meat grinder of suitable size, although any other means of comminution may be employed. The glands are preferably frozen at a temperature below about minus 30° C. substantially immediately after isolation from the animal body. This may be accomplished in any number of ways, as, for example, by storing the gland, immediately upon removal from the animal, in a container cooled with liquid nitrogen or solid carbon dioxide, although other methods of cooling the gland to below about 0° C. are satisfactory. It is highly desirable that the gland be maintained at such lower temperatures until used in the process of the invention, since the glands can thus be stored until a sufficient quantity for large scale use has been accumulated and can also be transported considerable distances in this condition. Moreover, the activity of the gland in the process of the invention has been found to be enhanced where the gland is frozen immediately upon removal from the freshly slaughtered animal.

The ground gland tissues (e.g. vesicular gland tissues) and the material to be converted are intimately admixed, as by vigorous agitation or homogenization in a Waring-type blender or other grinding device. The mixture may thereafter be admixed with a suitable medium, or alternatively, the ground gland may be admixed with the medium prior to the blending operation. The mixture is thereafter maintained preferably at or about 37.5° C., i.e., body temperature, but temperatures between about 20 and 40° C. are also operative. The medium employed for the reaction, which has been previously referred to, is an aqueous nutrient medium, which may consist of body fluids, for example, blood or plasma, or a slightly alkaline physiological saline solution such as Krebs-Ringer solution made alkaline to a pH of about 7.4, as with sodium bicarbonate, or a Ringer-phosphate buffer solution, or other physiological saline solutions, or an aqueous solution of water containing bacteriostatic quantities of alcohol, e.g., up to about 20 percent alcohol or even water containing traces of minerals and other elements such as are commonly present in tap water, which of itself provides a satisfactory nutrient medium for carrying out the process of the present invention. The pH of the medium employed is preferably slightly alkaline, e.g., about 7.4, but a medium having a pH anywhere in the range between about 6.5 and 8.0 is also satisfactory. Cofactors, such as those containing an adenine of nicotinamide nucleus, may also be included in the medium and such cofactors are preferably included since the yields appear to be increased when such cofactors are present. Representative cofactors which can be used include nicotinamide, cytochrome C, sodium adenosine triphosphate, Coenzyme I (diphosphopyridine nucleotide), FAD (flavin-adenine dinucleotide), adrenocorticotropic hormone (ACTH), and the like, with nicotinamide being preferred for highest yields.

The fatty acid employed as substrate can be added to the gland suspension in the form of the free acid or as a salt such as the sodium, potassium, calcium and like salts.

The incubation is carried out under aerobic conditions, i.e., in the presence of oxygen, and for this reason it is necessary that the reaction mixture be, at a minimum, stirred occasionally to provide oxygen from the air. While such procedure as occasional stirring is operative as a means of providing aerobic conditions, it is preferred to pass an oxygen-containing gas into the reaction through a suitable means, such as fritted glass discs, carborundum balls, sparger tubes, Berkfeld filter candles, and the like. The oxygen, or the oxygen-containing gas, can be passed into the reaction mixture in any quantities sufficient to maintain aerobic conditions within the incubation medium, and the rate of aeration may therefore be varied considerably, depending particularly upon the amount of glands employed or the size of the run. However, it has been found that between about 0.1 and about five liters of oxygen is satisfactory, between about 0.5 and about five liters of oxygen per liter of solution being preferred. The employment of a diluent, such as carbon dioxide, nitrogen, helium, or the like, together with the aerating oxygen, apparently has no adverse effect upon operativeness of the process. The time of incubation will vary considerably, depending upon the rate of aeration as well as the ratio of ground gland to the unsaturated fatty acids. While periods of from two to five hours are in most instances satisfactory for the conversion of long chain unsaturated fatty acids (e.g., arachidonic acid) to prostaglandins and related compounds when unsaturated fatty acids are added to the glands from external sources, it should be apparent that, when the unsaturated fatty acids to be oxygenated are present only in the tissue, none being added to the comminuted gland from external sources, the time required for oxygenation may be considerably longer, perhaps due to the integral relation of these unsaturated fatty acids to the tissue fibers or other constituents of the gland tissue. Therefore, in instances when the unsaturated fatty acids are not added from external sources but are merely that amount present in the glands which are used for the incubation procedure, the time of reaction may advantageously be conducted for periods as long as 40 and even as long as 144 hours. It is to be noted, however, that exceedingly vigorous aeration over an extended period of time appears to have a somewhat detrimental effect upon the efficiency of the process. Other variable factors will also influence the conversion and yield of prostaglandins or related compounds such as the season of the year in which the gland was collected, average state of health of the animal from which the glands were collected, the particular cofactors present in the nutritive medium, the particular nutritive medium employed, and the like.

In the event that an aqueous alcohol is employed as a nutrient medium, together with aeration, it is often advantageous to add additional alcohol at a later stage in the process to replace that lost by evaporation. Moreover, in the event that a somewhat lengthy reaction period is desired to be employed, e.g., a reaction period from about four to 144 hours, the addition of an agent to prevent putrefaction of the glands may be advantageously employed if desired. Bacteriostatic agents, such as alcohols, toluene, benzene, benzoates, quaternary ammonium salts, chlorobutanol, and the like, as well as adjustment of the pH to within the desired range, and other known procedure for the prevention of putrefaction, may be employed to accomplish the desired result. A convenient method of preventing putrefaction is the employment of an aqueous alcoholic medium containing up to about 20 percent alcohol, in which case the alcohol appears to serve both as a part of the nutrient medium and as an agent for prevention of putrefaction. As mentioned previously, if aerating conditions are used during the incubation, additional alcohol may be advantageously added to replace that lost by evaporation.

The ratio of unsaturated fatty acids to gland, or vice versa, does not appear critical, since weight ratios of gland to unsaturated fatty acids of as little as 50 to 1 and as high as 2000 to 1 have proved satisfactory for the conversion of long chain unsaturated fatty acids (e.g., arachidonic acid) to protaglandins and related compounds. However, ratios even lower or higher are also operative, ratios as low as 10 parts of gland by weight to 1 part of unsaturated fatty acids being operative.

The desired material having prostaglandin-like activity produced by the process of the invention is isolated from the incubation reaction mixture by methods which are conventional in the art, for example, using the procedures described in U.S. Patent 3,069,322 for the isolation of prostaglandins PGE and PGF from gland extracts. Illustratively, the incubation reaction mixture can be clarified by conventional procedures such as filtration or centrifugation and the clarified solution can be concentrated to give an aqueous mixture which is extracted with a water-immiscible solvent such as methylene chloride, chloroform, carbon tetrachloride, ethylene chloride, trichloroethylene, ether, ethyl acetate, amyl acetate, benzene, and the like. The solvent extract is then evaporated to dryness to give a mixture of acids which is then separated by conventional procedures such as chromatography, counter current distribution and the like. Advantage is taken of hydrophilic and lipophilic solvents and aqueous buffer solutions to effect isolation and purification of the crude acids and advantage is taken of differences in polarity due to the added hydroxyl group in PGF types and the greater unsaturation in the bisdehyro- and the tetradehydro-PGE and bisdehydro- PGF types, e.g., bisdehydro-PGF>PGF>tetradehydro-PGE>bisdehydro-PGE>PGE. Thus by fractional liquid-liquid extraction techniques such as countercurrent distribution or partition chromatography, homogenous or single entities can be isolated from the crude extracts.

A preferred process involves extracting the crude material containing the active components, separating the acid components from the extract by contact with a material having affinity for acids, for example, aqueous buffer solutions or anion exchange resins, fractionating the crude acids by multi-stages of reverse phase, partition chromatography in which the first stage is heavily loaded so that the physiologically active acids are separated as a group from the inactive acids and the later stages are lightly loaded whereby the active acids are fractionated into separate compounds.

The extraction of the crude material is advantageously carried out in two steps in which the crude material is first extracted with water-miscible alkanols, for example methanol, ethanol, isopropanol, and the extracted material then transferred to a water-immiscible lipophilic solvent. This is accomplished by concentrating the alkanol to an essentially aqueous slurry and extracting the aqueous solution that is obtained with the water-immiscible lipophilic solvent. Suitable water-immiscible lipophilic solvents for this purpose include chlorinated hydrocarbons, for example, methylene chloride, chloroform, and ethylene dichloride; lower fatty acid esters, for example, ethyl acetate, and amyl acetate; the higher alkanols, for example, the water-immiscible butanols, the pentanols, the hexanols and the octanols; the water-immiscible lower alkanones, for example, methyl isobutyl ketone; ethers, for example, dimethyl ether, diethyl ether, methyl isobutyl ether; aromatic hydrocarbons, for example, benzene and toluene; and the like. If desired the crude material can be extracted directly with the water-immiscible lipophilic solvents but this is less preferred because the lower alkanols tend to denature and thus precipitate soluble proteins and are less likely to take up non-polar materials.

The crude extracts thus obtained are then treated to isolate the carboxylic acids. Generally pharmacologically undesirable fats, fatty acids, and other impurities contaminate these crude extracts. These contaminants are removed by one or more partitions between a lipophilic phase, such as the solutions in lipophilic solvents resulting from the extracting step, and buffered aqueous alkaline phases, for example, aqueous solutions of phosphate, bicarbonate, and tris-(hydroxymethylamino)methane. Any aqueous solution buffered at about pH 8–9 can be used. The lipophilic stage is extracted with the buffered aqueous phase, the buffered aqueous phase is then acidified to a pH of about 3–4, and redistribution is effected into the same or different lipophilic solvent. By suitable selection of the buffer pH and the lipophilic solvent, effective partition coefficients are obtained. The partition between the buffer phase and the lipophilic phase can be effected by countercurrent distribution if desired. With sufficient transfers, particularly with the less polar lipophilic solvents, for example, ether, and the lower pH, for example about pH 8, the PGE type acids concentrate more in the lipophilic phase while the PGF type acids concentrate in the buffer phase. It is not necessary and usually not desirable, however, to effect separation of the PGE and PGF types at this stage, but simply to extract all the active acid components into the final buffer phase then transfer them to a volatile solvent, for example, ether, from which the crude acids can be recovered by evaporation in vacuo.

The progress of the active materials from one fraction to another can be followed by quantitative in vitro assays of muscle stimulating properties according to van Euler, Archiv fur Physiologie, 77, 96–99 (1937). The total fatty acid concentration can be followed by microtitration with dilute alkali, and the PGE type acids (cyclopentanones) are readily followed and distinguished from the PGF type acids (cyclopentanols) by the characteristic carbonyl absorption in the infrared near 1730 cm.$^{-1}$ and by development of ultraviolet absorption near 280 mu with alkali.

Alternatively, the active acids can be recovered from the crude extracts by absorption on and elution from anion exchange resins. In this case the transfer to a water-immiscible solvent can advantageously be omitted; and the water-miscible alkanol extract loaded directly on the ion-exchange column. Suitable anion exchange resins are obtained by chloromethylating, by the procedure given on pages 88 and 97 of Kunin, Ion Exchange Resins, John Wiley and Sons, Inc., polystyrene resin, cross-linked if desired with divinyl benzene, prepared by the procedure given on page 97 of Kunin. Ion exchange resins of this type are marketed under the names of Dowex 1 and Dowex 2, Dowex 3, Dowex 21K, Ionac A–300, Amberlites IRA–400 and IRA 401, Amberlite IR–45, Duolite A–102, and Duolites A–2, A–4, A–6. The adsorbed acids can be eluted with solvents for the acids, for example, those solvents listed above, acidified to pH of 3–4 with hydrochloric acid or with ammonium chloride. Aqueous solutions of water-miscible alkanols and ammonium chloride, for example, a 50 percent solution of ammonium chloride in 70 percent aqueous methanol can be effectively used.

The crude acids recovered from the crude extracts by one or the other procedure are then fractionated by multistage, reverse phase, partition chromatography. If desired a transfer from a highly non-polar solvent, for example, petroleum ether or like hydrocarbon solvent, to a hydrophilic solvent, advantageously an aqueous solution of a water-miscible alkanol, can be interposed to effect separation of the more non-polar impurities. On extraction of the non-polar solvent solution with aqueous alcoholic solution, the more highly non-polar components stay in the non-polar solvent. In the multi-stage, reverse phase, partition chromatography, the column in the first stage is loaded heavily in order to effect a rough separation of the desired active acids from the more and less polar components. The later stages are charged with the active fraction from the preceding stage but with a substantially lower loading than used in the first stage so that more effective separation into the component acids is obtained. The loading in the first stage can range from about 50 to about 250 mg. of crude acid per gram of support whereas the loading in the latter stages should be less than about 25 mg. of acid per gram of support. Suitable supports for the partition columns are hydrophobic diatomite (kieselguhr treated with chloromethylsilane) or finely divided, low-temperature polyethylene. The latter is advantageously used in the first stage. Any of the diatomaceous earths used as filter aids can be utilized by treating them with chloromethylsilane to render them hydrophobic. The high flow types, as exemplified by Hyflo Supercel, can be used advantageously. If desired the intermediate fractions can be treated to crystallize out the PGE before further fractionation. The stationary phase for the partition column is a lipophilic water-immiscible solvent and the mobile phase is a hydrophilic solvent. Thus, the hydrophobic support has affinity for the stationary phase but not for the mobile phase. Consequently, the more polar components are concentrated in the mobile phase and the less polar ones in the stationary phase. Any combination of lipophilic and hydrophilic phases can be used for this purpose. Their efficiency, however, will depend upon the partition coefficient. We have found that effective separation is obtained when the mobile phase is a solution of a water-miscible alkanol in water in about equal proportions, say between 3:5 to 5:3. Any immiscible lipophilic solvent can be used for the stationary phase but advantageously a mixture of relatively polar and non-polar solvents are employed, for example, a mixture of water-immiscible alkanols or alkanones or lower fatty acid esters with hydrocarbon or chlorinated hydrocarbon solvents. The two types of immiscible lipophilic solvents also should be in approximately equal proportions, say between 3:5 to 5:3. The mobile solvents and the stationary solvents are mixed and equilibrated to form the two phases. The stationary phase is then put on the column and the column is loaded with the charge, preferably dissolved or mixed with a small amount of one of the phases, preferably the mobile phase. The column is then eluted with the mobile phase.

By using a solvent system made up of a water-miscible alkanol and water in the proportions of 9:10 to 10:9 and a water-immiscible alkanol and chloroform in the proportions of 9:10 to 10:9 effective separation of the PGE type acids can be obtained in two stages of reverse phase, partition chromatography under the conditions of loading described above. On eluting the columns the progress of the components is followed by in vitro assays, microtitrations, paper chromatography or other assays and the desired fractions are pooled either for further processing or for recovery of the component fractionated.

While the process of the invention can be employed as described above in the bioconversion of any fatty acid having a 1,4-diene grouping in the hydrocarbon chain, it is of particular value in the bioconversion of certain fatty acids which can be represented by the following formula:

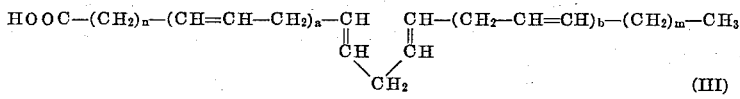

(III)

wherein $n$ is an integer from 1 to 8, inclusive, $a$ and $b$ are integers from 0 to 2, inclusive, and $m$ is an integer from 1 to 12, inclusive, provided that the sum of $3a+n$ is from 1 to 8, inclusive, and the sum of $3b+m$ is from 1 to 12, inclusive.

When subjected to the process of the invention as hereinbefore described an acid of the Formula III is converted to a product or a mixture of products represented by the following formula:

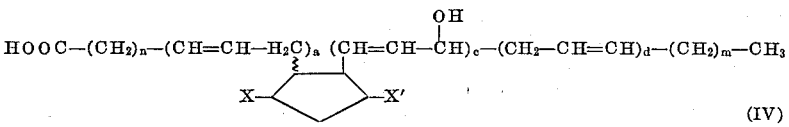

(IV)

wherein X and X' are selected from the class consisting of keto and α-hydroxy, $n$, $m$, and $a$ have the significance above defined, $c$ is an integer from 0 to 1, inclusive, and $d$ is an integer from 0 to 2, inclusive, and the sum of $3c+3d+m$ is from 1 to 12, inclusive. The wavy line attachment in the above Formula IV is inclusive of both the α- and β-configurations.

The identity of the end product (IV) obtained from the corresponding substrate (III) varies according to the nature of the substrate and of the animal glands employed in the process of the invention. In general a mixture of products will be obtained in which the major components are the compounds of Formula IV corresponding to the particular substrate (III) employed but having the carboxylic acid side chain attached in the α-configuration, having X' as α-hydroxy, X as either α-hydroxy or keto and $c=0$ or 1.

The products (IV) are compounds having prostaglandin-like activity as hereinbefore defined, i.e., they exhibit hypotensive and smooth-muscle stimulating activity. In particular, the major products obtained by submitting arachidonic acid (III: $a=1$, $n=3$, $b=1$, $m=4$) to the bioconversion process of the invention are found to be the prostaglandins $PGF_{1\alpha}$, $PGF_{2\alpha}$, $PGE_1$, and $PGE_2$. The hypotensive activity of the compounds (IV) makes them useful in the control of hypertension in man and valuable domestic animals and in laboratory animals such as mice, rats and rabbits.

The compounds of Formula IV also possess activity as fertility-controlling agents, central nervous system regulatory agents, salt- and water-retention regulatory agents, and fat metabolic regulatory agents.

Illustrative of known fatty acids having the Formula III which can be employed as substrates in the process of the invention are:

5,8,11,14-eicosatetraenoic acid (arachidonic acid),
5,8,11,14,17-eicosapentaenoic acid,
8,11,14,17-eicosatetraenoic acid,
5,8,11-eicosatrienoic acid,
8,11,14-eicosatrienoic acid,
11,14-eicosadienoic acid,
9,12-octadecadienoic acid (linoleic acid),
6,9,12-octadecatrienoic acid (linolenic acid),
11,14-octadecadienoic acid,
9,12-hexadecadienoic acid,
7,10,13-hexadecatrienoic acid.

On reaction of the acids IV with bases and carboxyl-esterifying agents the corresponding carboxylates (salts and esters) are obtained. Carboxylates exhibit the same activity as the free acids and can be used for the same purposes. Thus, the acids of the invention can be utilized in the free acid form or in the form of an ester or a pharmacologically acceptable salt, for example, a hydrocarbyl ester in which the hydrocarbyl group contains not more than 13 carbon atoms, or a salt of an alkali metal or alkaline earth base, for example, sodium, potassium, lithium, calcium, barium, strontium, and magnesium or of ammonia or a basic amine such as mono-, di-, and triethylamines, mono-, di-, and tripropylamines (iso and normal), ethyldimethylamine, benzyldiethylamine, cyclohexylamine, benzylamine, dibenzylamine, N,N'-dibenzylethylene diamine, N-methyl bis-ortho-methoxy-phenylisopropylamine, methoxyphenylisopropylamine, and like lower-aliphatic, lower-cycloaliphatic, and lower-aralipathic amines up to and including about eighteen carbon atoms; heterocyclic amines such as piperidine, morpholine, pyrrolidine, piperazine, and the lower alkyl derivatives thereof such as, 1-methylpiperidine, 4-ethylmorpholine, 1-isopropylpyrrolidine, 1,4-dimethylpiperazine, 1-n-butyl-piperidine, 2-methylpiperidine, 1-ethyl-2-methylpiperidine; as well as amines containing water-solubilizing or hydrophilic groups such as mono-, di-, and triethanolamines, ethyldiethanolamine, n-butylmonoethanolamine, 2-amino-1-butanol, 2-amino-2-ethyl-1,3-propanediol, 2-amino-2-methyl-1-propanol, tris(hydroxymethyl)aminomethane, phenylmonoethanolamine, p-tertiaryamylphenyldiethanol amine, and galactamine, N-methyl glucamine, N-methyl glucosamine, ephedrine, phenylephrine, epinephrine, and procaine, and can also be used in the form of their carboxylate esters for example the methyl, ethyl, 2-ethyl-hexyl, cyclohexyl, cyclohexylmethyl, benzyl, benzhydryl, and like hydrocarbyl esters containing not more than 13 carbon atoms. These esters can be formed by the usual methods, for example, by reaction with diazomethane or other appropriate diazohydrocarbons.

The pharmacologically active acids IV, in the form of the free acids or salts or carboxylate esters thereof, produced by the process of the invention can be formulated and administered to birds and mammals, including man, rats, mice, and valuable domestic animals in a wide variety of oral or parenteral dosage, forms, singly, or in admixture with other active compounds. They can be associated with a pharmaceutical carrier which can be solid material or a liquid in which the compound is dissolved, dispersed or suspended. The solid compositions can take the form of tables, powders, capsules, pills, and the like, preferably in unit dosage forms for simple administration or precise dosages. The liquid compositions can take the form of solutions, emulsions, suspensions, syrups, or elixirs.

The following examples illustrate the best mode contemplated by the inventors for carrying out their invention but are not to be construed as limiting the scope thereof.

EXAMPLE 1

Sheep vesicular glands were frozen, by dropping them into Dry-Ice, immediately after their removal from freshly slaughtered animals. The frozen glands (18.7 kg.) were ground in a motor-driven meat grinder. The ground gland was added to a mixture of 37.4 liters of Krebs-Ringer solution (a nutrient medium) made alkaline to pH 7.4 with sodium bicarbonate, and 108 g. of nicotinamide (cofactor). To the mixture was added 35.3 g. of arachidonic acid and the resulting suspension was mixed thoroughly for about 5 minutes before being transferred to an incubation tank and maintained at 37° C. for 2 hours. During the incubation period a mixture of 95 percent oxygen and 5 percent carbon dioxide was bubbled through the suspension at a rate of about 8 liters per minute.

The material from the incubation step was extracted three times with 100 liters of acetone over a period of 24 hours and the spent gland was separated and discarded. The acetone extracts were evaporated to dryness under reduced pressure. The residue was assayed using a combination of paper strip chromatography, biological assay for hypotensive activity carried out substantially as described by Horton et al., supra, and for smooth muscle stimulating properties carried out as described by von Euler, supra. The major products were found to be $PGF_{1\alpha}$, $PGF_{2\alpha}$, $PGE_1$, and $PGE_2$.

The mixture so obtained was separated into its major components using the following procedure.

The product isolated as described above was subjected to a five-stage countercurrent distribution between equal volumes of ether and 0.5 molar phosphate buffer at pH 6.4. The buffer phases were acidified and extracted three times with ether. All phases were evaporated to dryness, weighed, and the physiological activity of each was determined using the assays described above. The samples which were thus found to contain the bulk of the major components were each pooled and treated separately as follows. Each sample was dissolved in the mobile phase of an isooctanol: chloroform: methanol: water (1:1:10:10) system at the rate of about 100 milligrams per 3 to 5 mls. of mobile phase. A column in which 4 ml. of static phase (upper phase) of an isooctanol:chloroform: methanol:water (1:1:10:10) system was supported on 4.5 g. of hydrophobic diatomite (kieselguhr treated with chloromethylsilane) was charged with 100 milligrams of the pooled sample mixed with a minimum of about 3 to 5 ml. of mobile phase, and then developed with mobile phase. The eluate fractions from the column were assayed for smooth muscle activity using the test of von Euler, supra. Those fractions showing peak activities were evaporated. There were thus obtained the essentially pure components of the original mixture, i.e., $PGF_{1\alpha}$, $PGF_{2\alpha}$, $PGE_1$, and $PGE_2$.

The above procedure of Example 1 was repeated using sodium arachidonate in place of arachidonic acid with substantially the same results.

EXAMPLE 2

To a suspension of 3 kilograms of ground frozen hog adrenal glands (frozen in Dry-Ice immediately after removal from freshly slaughtered animals and maintained in the frozen state until ground) in 3 liters of water was added a solution of 5 g. of arachidonic acid in 600 ml. of 95 percent ethanol. The slurry was placed in a glass-lined can and allowed to incubate for 120 hours with occasional stirring at a temperature which varied between 25 and 30° C. At the end of this period 10 liters of acetone were added and then spent gland and debris were removed by centrifugation. The acetone extract was evaporated to dryness under reduced pressure. There was then obtained a residue containing as the major physiologically active components $PGF_{1\alpha}$, $PGF_{2\alpha}$, $PGE_1$ and $PGE_2$ which compounds were separated and isolated using the procedure described in Example 1.

The above procedure was repeated except that a stream of air (5 liters per minute) was bubbled through the mixture throughout the incubation. The yield of prostaglandins was thereby increased significantly.

EXAMPLE 3

Using the procedure of Example 1, but replacing sheep vesicular glands by the same weight of ground frozen beef lung tissue, there is obtained a mixture of prostaglandins $PGF_{1\alpha}$, $PGF_{2\alpha}$, $PGE_1$ and $PGE_2$, which compounds are separated and isolated using the procedure described in Example 1.

EXAMPLE 4

Using the procedure described in Example 1, but replacing arachidonic acid by linolenic acid, there was obtained a mixture containing as its major components:

5-[3α,5α-dihydroxy-2-(3-hydroxy-1-octenyl)cyclopentyl]-pentanoic acid

5-[3α-hydroxy-2-(3-hydroxy-1-octenyl)-5-oxocyclopentyl]-pentanoic acid,

8-[3α,5α-dihydroxy-2-(3-hydroxy-1-pentenyl)cyclopentyl]-octanoic acids, and

8-[3α-hydroxy-2-(3-hydroxy-1-pentenyl)-5-oxocyclopentyl]-octanoic acid.

This mixture was separated into its component parts by countercurrent distribution followed by reversed phase partition chromatography using the procedures described in Example 1.

EXAMPLE 5

Using the procedure described in Example 1, but replacing arachidonic acid by linoleic acid, there was obtained a mixture containing as its components:

8-[3α,5α-dihydroxy-2-pentylcyclopentyl]octanoic acid, and

8-[3α-hydroxy-2-pentyl-5-oxocyclopentyl]octanoic acid.

This mixture was separated into its component parts by countercurrent distribution followed by reversed phase partition chromatography using the procedures described in Example 1.

EXAMPLE 6

Using the procedure described in Example 1, but replacing arachidonic acid by 5,8,11,14,17-eicosapentaenoic acid, there was obtained a mixture containing as its major components:

tetradehydroPGE ($PGE_3$) and tetradehydo PGF ($PGF_{3\alpha}$)

This mixture was separated into its component parts by countercurrent distribution followed by reversed phase partition chromatography using the procedure described in Example 1.

EXAMPLE 7

Using the procedure described in Example 1, but replacing arachidonic acid by 8,11,14,17-eicosatetraenoic acid, there was obtained a mixture containing as its major components:

7-[3α-hydroxy-2-(3-hydroxy-1,5-octadienyl)-5-oxo-cyclopentyl]-heptanoic acid,

7-[3α,5α-dihydroxy-2-(3-hydroxy-1,5-octadienyl)cyclopentyl]-heptanoic acid,

10-[3α-hydroxy-2-(3-hydroxy-1-pentenyl)-5-oxo-
cyclopentyl]-8-decenoic acid, and
10-[3α,5α-dihydroxy-2-(3-hydroxy-1-pentenyl)cyclo-
pentyl]-8-decenoic acid.

This mixture was separated into its componet parts by countercurrent distribution followed by reversed phase partition chromatography using the procedures described in Example 1.

EXAMPLE 8

Using the procedure described in Example 1, but replacing arachidonic acid by 5,8,11-eicosatrienoic acid, there was obtained a mixture containing as its major components:

7-[3α-hydroxy-2-octyl-5-oxocyclopentyl]-5-heptenoic
acid,
7-[3α,5α-dihydroxy-2-octylpentyl]-5-heptenoic acid,
4-[3α-hydroxy-2-(3-hydroxy-1-undecenyl)-5-oxo-
cyclopentyl]-butanoic acid, and
4-[3α,5α-dihydroxy-2-(3-hydroxy-1-undecenyl)cyclo-
pentyl]-butanoic acid.

This mixture was separated into its component parts by countercurrent distribution followed by reversed phase partition chromatography using the procedures described in Example 1.

EXAMPLE 9

Using the procedure described in Example 1, but replacing arachidonic acid by 8,11,14-eicosatrienoic acid, there was obtained a mixture containing as its major components:

$PGE_1$,
$PGF_{1\alpha}$,
10-[3α-hydroxy-2-pentyl-5-oxocyclopentyl]-8-
decenoic acid, and
10-[3α,5α-dihydroxy-2-pentylcyclopentyl]-8-
decenoic acid.

This mixture was separated into its component parts by countercurrent distribution followed by reversed phase partition chromatography using the procedures described in Example 1.

EXAMPLE 10

Using the procedure described in Example 1, but replacing arachidonic acid by 11,14-eicosatrienoic acid, there was obtained a mixture containing as its major components:

10-[3α-hydroxy-2-pentyl-5-oxocyclopentyl]decanoic
acid, and
10-[3α,5α-dihydroxy-2-pentylcyclopentyl]decanoic acid.

This mixture was separated into its component parts by countercurrent distribution followed by reversed phase partition chromatography using the procedures described in Example 1.

EXAMPLE 11

Using the procedure described in Example 1, but replacing arachidonic acid by 11,14-octadecadienoic acid, there was obtained a mixture containing as its major components:

10-[3α-hydroxy-2-propyl-5-oxocyclopentyl]decanoic
acid and
10-[3α,5α-dihydroxy-2-propylcyclopentyl]decanoic acid.

This mixture was separated into its component parts by countercurrent distribution followed by reversed phase partition chromatography using the procedures described in Example 1.

EXAMPLE 12

Using the procedure described in Example 1, but replacing arachidonic acid by 9,12-hexadecadienoic acid, there was obtained a mixture containing as its major components:

8-[3α-hydroxy-2-propyl-5-oxocyclopentyl]octanoic acid
and
8-[3α,5α-dihydroxy-2-propylcyclopentyl]octanoic acid.

This mixture was separated into its component parts by countercurrent distribution followed by reversed phase partition chromatography using the procedures described in Example 1.

EXAMPLE 13

Using the procedure described in Example 1, but replacing arachidonic acid by 7,10,13-hexadecatrienoic acid, there was obtained a mixture containing as its major components:

6-[3α-hydroxy-2-(3-hydroxy-1-pentenyl)-5-oxocyclo-
pentyl]-hexanoic acid,
6-[3α,5α-dihydroxy-2-(3-hydroxy-1-pentenyl)cyclo-
pentyl]-hexanoic acid,
9- 3α-hydroxy-2-ethyl-5-oxocyclopentyl]-7-nonenoic
acid, and
9-[3α,5α-dihydroxy-2-ethylcyclopentyl]-7-nonenoic acid.

This mixture was separated into its component parts by countercurrent distribution followed by reversed phase partition chromatography using the procedures described in Example 1.

EXAMPLE 14

*Methyl 5-[3α,5α-dihydroxy-2-(3-hydroxy-
1-octenyl)cyclopentyl]pentanoate*

To a dry ether solution of 10 milligrams of 5-[3α,5α-dihydroxy - 2 - (3 - hydroxy - 1 - octenyl)cyclopentyl]-pentanoic acid was added a slight excess of diazomethane, prepared in ether from four micromoles of nitrosomethyl-urethane. The reaction mixture was allowed to stand for about five minutes and the ether and excess diazomethane was distilled off. On distillation to dryness there was obtained methyl 5-[3α,5α-dihydroxy-2-(3-hydroxy-1-octenyl)cyclopentyl]pentanoate.

Similarly, using the above procedure but replacing 5 - [3α,5α - dihydroxy - 2 - (3 - hydroxy - 1 - octenyl)-cyclopentyl]pentanoic acid by any of the other acids prepared as described in Examples 1 through 13, there are obtained the corresponding methyl esters.

In like manner, using the above procedure but replacing diazomethane by other diazoalkanes such as diazo-ethane, 1-diazo-2-ethylhexane, cyclohexyldiazomethane, phenyldiazomethane, diphenyldiazomethane and the like, there can be obtained the ethyl, 2-ethylhexyl, cyclohexyl-methyl, benzyl, benzhydryl and like esters of 5-[3α,5α-dihydroxy - 2 - (3 - hydroxy - 1 - octenyl) - cyclopentyl]-pentanoic acid or any of the other acids described in Examples 1 through 13 hereinabove. Other methods can also be used for preparing the same and like esters. For example, the silver salts of the acids prepared as described in Examples 1 to 13 can be reacted with the appropriate iodide, for example, methyl, ethyl, 2-ethyl-hexyl, cyclohexylmethyl, benzyl, or benzhydryl iodide.

EXAMPLE 15

*Sodium 5-[3α,5α-dihydroxy-2-(3-hydroxy-1-
octenyl)cyclopentyl]pentanoate*

A suspension of 10 milligrams of 5-[3α,5α-dihydroxy-2-(3-hydroxy-1-octenyl)cyclopentyl]pentanoic acid in 10 ml. of water was shaken with one equivalent of a solution of sodium hydroxide in water until no insoluble matter remained. The resulting solution was evaporated to dryness under reduced pressure to yield sodium 5 - [3α,5α - dihydroxy - 2 - (3 - hydroxy - 1 - octenyl)-cyclopentyl]pentanoate in the form of a solid.

Similarly, using the above procedure but replacing sodium hydroxide by potassium hydroxide, lithium hydroxide, ammonium hydroxide, ethylamine and the like, there are obtained the corresponding salts of 5-[3α,5α-dihydroxy - 2 - (3 - hydroxy - 1 - octenyl)cyclopentyl]-pentanoic acid.

Similarly, using the above procedure and neutralizing any of the acids set forth in Examples 1 to 13 with the appropriate inorganic or organic base there are obtained the corresponding salts.

We claim:

1. The process which comprises aerobically incubating a fatty acid having the formula:

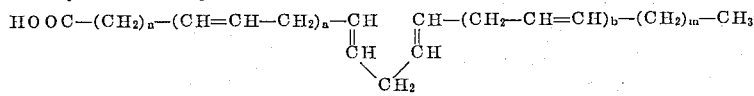

wherein $n$ is an integer from 1 to 8, inclusive, and $a$ and $b$ are integers from 0 to 2, inclusive, and $m$ is an integer from 1 to 12, inclusive, provided that the sum of $3a+n$ is from 1 to 8, inclusive, and the sum of $3b+m$ is from 1 to 12, inclusive, with comminuted mammalian gland tissue in a substantially aqueous medium and recovering from the incubation reaction mixture a material having prostaglandin-like activity.

2. The process of claim 1 wherein the mammalian gland tissue employed is sheep vesicular gland tissue.

3. A process which comprises aerobically incubating a fatty acid having the formula:

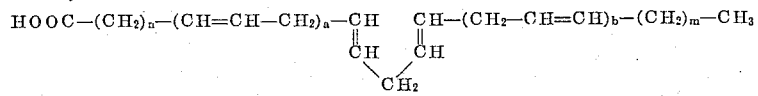

wherein $n$ is an integer from 1 to 8, inclusive, $a$ and $b$ are integers from 0 to 2, inclusive, and $m$ is an integer from 1 to 12, inclusive, provided that the sum of $3a+n$ is from 1 to 8, inclusive, and the sum of $3b+m$ is from 1 to 12, inclusive, with comminuted mammalian gland tissue in a substantially aqueous medium and recovering from the incubation reaction mixture a compound having the formula:

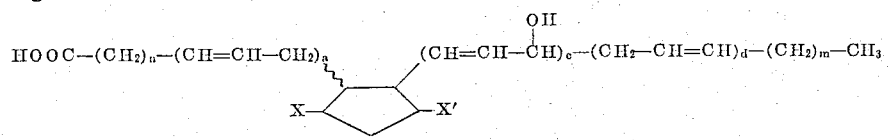

wherein X and X' are selected from the class consisting of keto and α-hydroxy, $n$, $m$, and $a$ have the significance hereinbefore defined, $c$ is an integer from 0 to 2, inclusive, and $d$ is an integer from 0 to 2, inclusive, provided that the sum of $3a+n$ is from 1 to 8, inclusive, and the sum of $3c+3d+m$ is from 1 to 12, inclusive.

4. The process of claim 3 wherein the mammalian gland tissue employed is sheep vesicular gland tissue.

5. The process which comprises aerobically incubating a compound selected from the class consisting of arachidonic acid and an alkali metal salt thereof with comminuted mammalian gland tissue in a substantially aqueous medium and recovering from the incubation reaction mixture a mixture of prostaglandins.

6. The process of claim 5 wherein the mammalian gland tissue employed is sheep vesicular gland tissue.

7. The process which comprises aerobically incubating a compound selected from the class consisting of arachidonic acid and an alkali metal salt thereof with comminuted mammalian gland tissue in a substantially aqueous medium, recovering from the incubation reaction a material having prostaglandin-like activity and having as its major physiologically active components $PGF_{1α}$, $PGF_{2α}$, $PGE_1$, and $PGE_2$, and separating said major components.

8. The process of claim 7 wherein the mammalian gland tissue employed is sheep vesicular gland tissue.

9. The process which comprises aerobically incubating 8,11,14-eicosatrienoic acid with comminuted mammalian gland tissue in a substantially aqueous medium and recovering from the incubation reaction mixture a material having prostaglandin-like activity.

10. The process of claim 9 wherein the mammalian gland tissue employed is sheep vesicular gland tissue.

11. The process which comprises aerobically incubating 5,8,11,14,17-eicosapentaenoic acid with comminuted mammalian gland tissue in a substantially aqueous medium and recovering from the incubation mixture a material having prostaglandin-like activity.

12. The process of claim 11 wherein the mammalian gland tissue employed is sheep vesicular gland tissue.

13. A process for the conversion of arachidonic acid to a mixture of prostaglandins which process comprises aerobically incubating arachidonic acid with previously frozen, comminuted mammalian gland tissue in a substantially aqueous medium at a temperature between about 20° C. and about 40° C. until a significant amount of material having prostaglandin-like activity is produced and recovering the latter material from the incubation mixture.

14. The process of claim 13 wherein the mammalian gland tissue is sheep vesicular gland tissue.

15. The process of claim 13 wherein the aqueous medium contains up to about twenty percent by volume of ethanol.

16. A process for the conversion of arachidonic acid to a mixture of prostaglandins which process comprises aerobically incubating arachidonic acid with previously frozen, comminuted sheep vesicular gland tissue in an aqueous alcoholic medium at a temperature between about 20° C. and about 40° C. until a significant amount of prostaglandins is produced, recovering a mixture of prostaglandins from the incubation mixture and separating said mixture of prostaglandins into its components.

References Cited by the Examiner

Biochemica et Biophysica Acta, 90, 204–210 (July 15, 1964), Elsevier Publishing Co., Amsterdam.

A. LOUIS MONACELL, *Primary Examiner.*

L. M. SHAPIRO, *Assistant Examiner.*